United States Patent
Bach

(10) Patent No.: US 8,047,595 B2
(45) Date of Patent: Nov. 1, 2011

(54) REMOTE RELEASE WITH POWERED ACTUATOR

(75) Inventor: James W. Bach, Gowen, MI (US)

(73) Assignee: Grand Rapids Controls Company, LLC, Rockford, MI (US)

( * ) Notice: Subject to any disclaimer, the term of this patent is extended or adjusted under 35 U.S.C. 154(b) by 393 days.

(21) Appl. No.: 12/235,096

(22) Filed: Sep. 22, 2008

(65) Prior Publication Data

US 2009/0079240 A1    Mar. 26, 2009

Related U.S. Application Data

(60) Provisional application No. 60/974,281, filed on Sep. 21, 2007.

(51) Int. Cl.
*B60N 2/02* (2006.01)
*B60N 2/22* (2006.01)

(52) U.S. Cl. ............... 296/65.08; 297/217.3; 74/473.15

(58) Field of Classification Search ............. 296/65.08, 296/65.09; 297/378.12, 217.3; 74/473.15, 74/473.12; 475/3, 4
See application file for complete search history.

(56) References Cited

U.S. PATENT DOCUMENTS

| | | | | |
|---|---|---|---|---|
| 5,363,718 A | * | 11/1994 | Ganser et al. | 74/501.5 R |
| 7,090,277 B2 | * | 8/2006 | Andrigo et al. | 296/65.08 |
| 7,152,922 B2 | * | 12/2006 | Garland | 297/362.11 |
| 7,320,501 B2 | | 1/2008 | Keyser et al. | |
| 7,329,199 B2 | | 2/2008 | Blendea et al. | |
| 7,547,070 B2 | * | 6/2009 | Nathan et al. | 297/378.12 |
| 2007/0236067 A1 | * | 10/2007 | Nathan et al. | 297/378.12 |

* cited by examiner

*Primary Examiner* — Glenn Dayoan
*Assistant Examiner* — Melissa A Black
(74) *Attorney, Agent, or Firm* — Price Heneveld LLP

(57) ABSTRACT

A powered actuator includes a rotating output member that may be operatively connected to one or more cables or mechanical links for release/actuation of a lock, latch, or the like, of a vehicle seat or other component. The powered actuator may be configured to provide a required force on the release cable and/or a required distance of travel. The actuator may also be configured to provide for proper timing of the movement of the release cables if required for a particular application.

20 Claims, 16 Drawing Sheets

US 8,047,595 B2

REMOTE RELEASE WITH POWERED ACTUATOR

CROSS REFERENCE TO RELATED APPLICATION

This application claims the benefit of U.S. Provisional Patent Application No. 60/974,281 entitled REMOTE RELEASE WITH POWERED ACTUATOR, filed Sep. 21, 2007, the entire contents which are hereby incorporated by reference.

BACKGROUND OF THE INVENTION

Various types of powered actuators have been developed to provide for release/actuation/adjustment/movement of various components. For example, powered actuators may be utilized in vehicle interiors to provide for powered release of latches, locks, or the like. The powered actuators in such situations may be mounted some distance from the latch or lock, and a cable or linkage may be utilized to interconnect the powered actuator and the latch or lock. Different types of latches and locks may have different requirements with respect to the amount of force that is required to release the lock or latch. Also, latches and/or locks typically include a movable input/release member, and the distance that the released member must be moved to provide for proper release of the latch or lock may be quite different depending upon the design of the particular latch or lock. Thus, a variety of powered actuators have been developed to accommodate the various types of latches and locks that may be utilized in various applications.

SUMMARY OF THE INVENTION

One aspect of the present invention is a powered actuator that can be readily reconfigured to provide the required amount of force and/or travel distance to a cable or other link as required for a particular lock or latch. Also, the powered actuator may be configured to provide a plurality of outputs, such that the actuator can release/actuate a plurality of latches or locks. Furthermore, the timing of the movement of the outputs may be configured to meet the requirements of a particular application.

The actuator may include a single electric motor that drives a rotating output member, and the rotating output member may be operably interconnected with one or more cables to provide movement and force to the cables. The cables may be interconnected to the rotating member by links, and the connection points of the links to the rotating output member may be configured to provide the distance of travel and/or timing and/or force as required for each of the cables. Alternately, the rotating output member may include a cam surface that operably engages the cables to thereby provide the required force and/or timing and/or distance of travel for each of the cables.

According to one aspect of the present invention, a seat for a vehicle includes a base that is pivotally mounted to a floor structure of a vehicle, and a seat back is pivotally mounted to the base of the seat. The seat base is latched or locked relative to the floor structure by one or more latches or locks, and the seat back is retained in an upright position relative to the seat base by one or more additional locks or latches. The powered actuator may include a pair of cables that are operably connected to a pair of latches that retain the seat base to a floor structure of a vehicle, and the actuator may also include another pair of cables that are operably connected to a pair of locks or latches that selectively retain the seat back in an upright position relative to the seat base. Upon actuation, the powered actuator releases the locks or latches in the required sequence to provide for folding of the seat back relative to the seat base, and rotation of the seat back and base relative to the floor structure of the vehicle.

DETAILED DESCRIPTION OF PREFERRED EMBODIMENT

Figure 3:
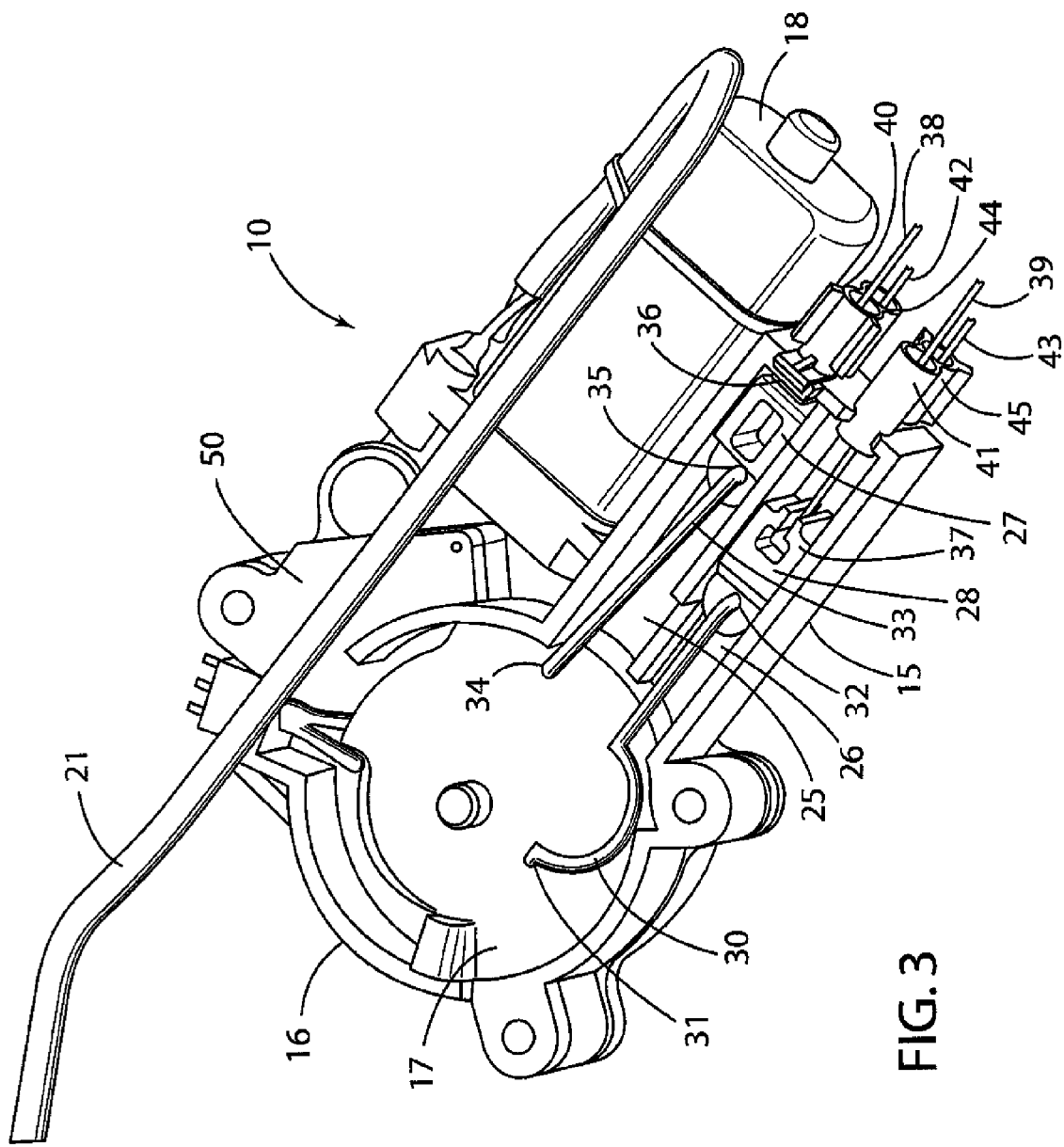
FIG. 3 is an isometric view of a powered actuator according to one aspect of the present invention.

For purposes of description herein, the terms "upper," "lower," "right," "left," "rear," "front," "vertical," "horizontal," and derivatives thereof shall relate to the invention as oriented in FIG. 3. However, it is to be understood that the invention may assume various alternative orientations and step sequences, except where expressly specified to the contrary. It is also to be understood that the specific devices and processes illustrated in the attached drawings described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
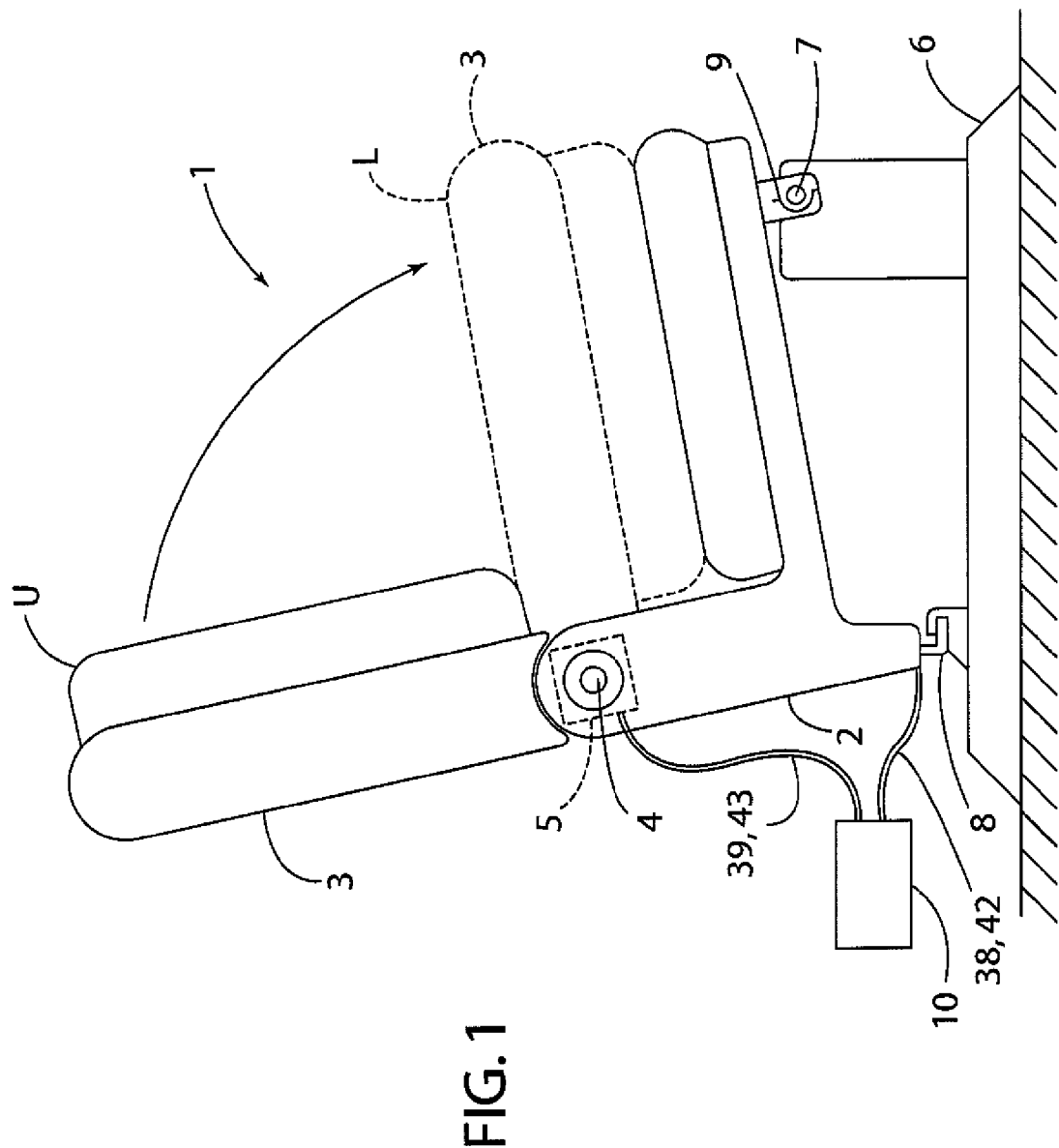
FIG. 1 is a partially schematic side elevation view of a folding/tumbling seat including a powered actuator according to one aspect of the present invention showing the seat in an upright use position.
Figure 2:
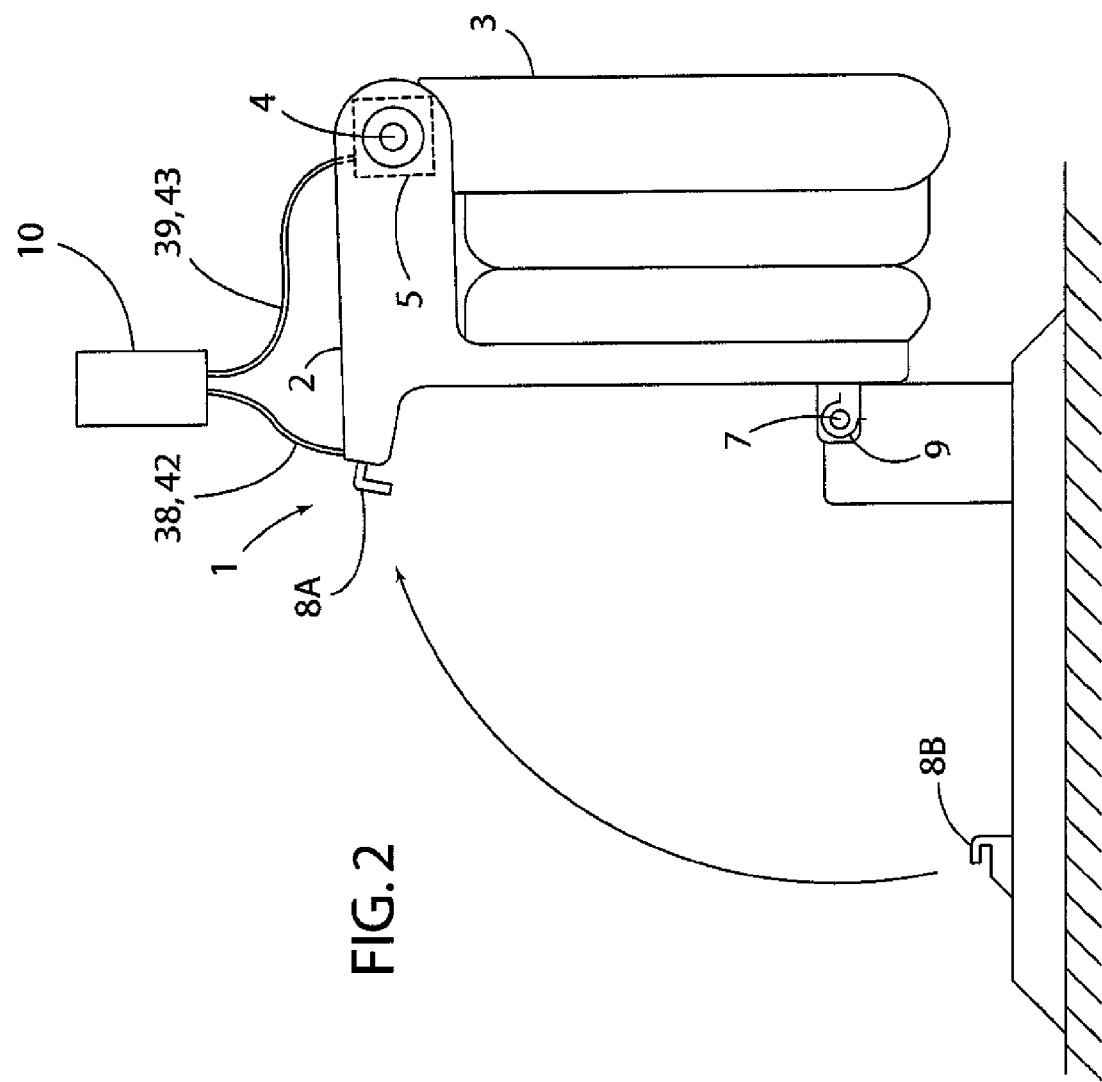
FIG. 2 is a partially schematic side elevation view of seat of FIG. 1 wherein the seat is in a folded/tumbled position.

With reference to FIG. 1, a seat assembly 1 for motor vehicles includes a base 2, and a back portion 3 that is pivotally mounted to the base 2 at pivot 4. A back latch 5 retains the back 3 in an upright position and/or provides for tilt adjustment of the back 3 relative to the base 2. The latch 5 may include a torsional spring (not shown) that biases the back 3 from an upright position "U" to a lowered position "L" relative to the base 2. The base 2 is pivotably mounted to a floor structure 6 at pivot 7, and a floor latch 8 retains the base 2 in the position illustrated in FIG. 1 unless the floor latch 8 is released as described in more detail below. A torsion spring 9 at pivot 7 biases the base 2 towards the upright position "U" shown in FIG. 2 to assist a user Upon release of floor latch 8, a user can move/tumble the seat 1 from the position of FIG. 1 to the position of FIG. 2. Back latch 5 and floor latch 8 may comprise conventional prior art latch mechanisms of a type known to those skilled in the art. A powered actuator 10 (FIG. 1) is operably connected to the latches 5 and 8 by cables 39, 43, and cables 38, 42, respectively. Seat 1 generally includes a pair of back latches 5 (one at each side of the seat assembly 1), and a pair of floor latches 8 (one at each side of the seat assembly 1). Cable 39 is connected to a first one of the back latches 5, and cable 43 is connected to a second one of the back latches 5. Similarly, cable 38 is connected to a first one of the floor latches 8, and cable 42 is connected to a second 1 of the floor latches 8. Although, the powered actuator 10 is shown schematically in FIGS. 1 and 2, it will be understood that the actuator 10 may be mounted at virtually any suitable location such as the lower side of seat base 2 or to the floor structure 6. The cables 38, 39, 42 and 43 may be configured to permit mounting of actuator 10 at various locations to meet the requirements of a particular application.

Figure 4:
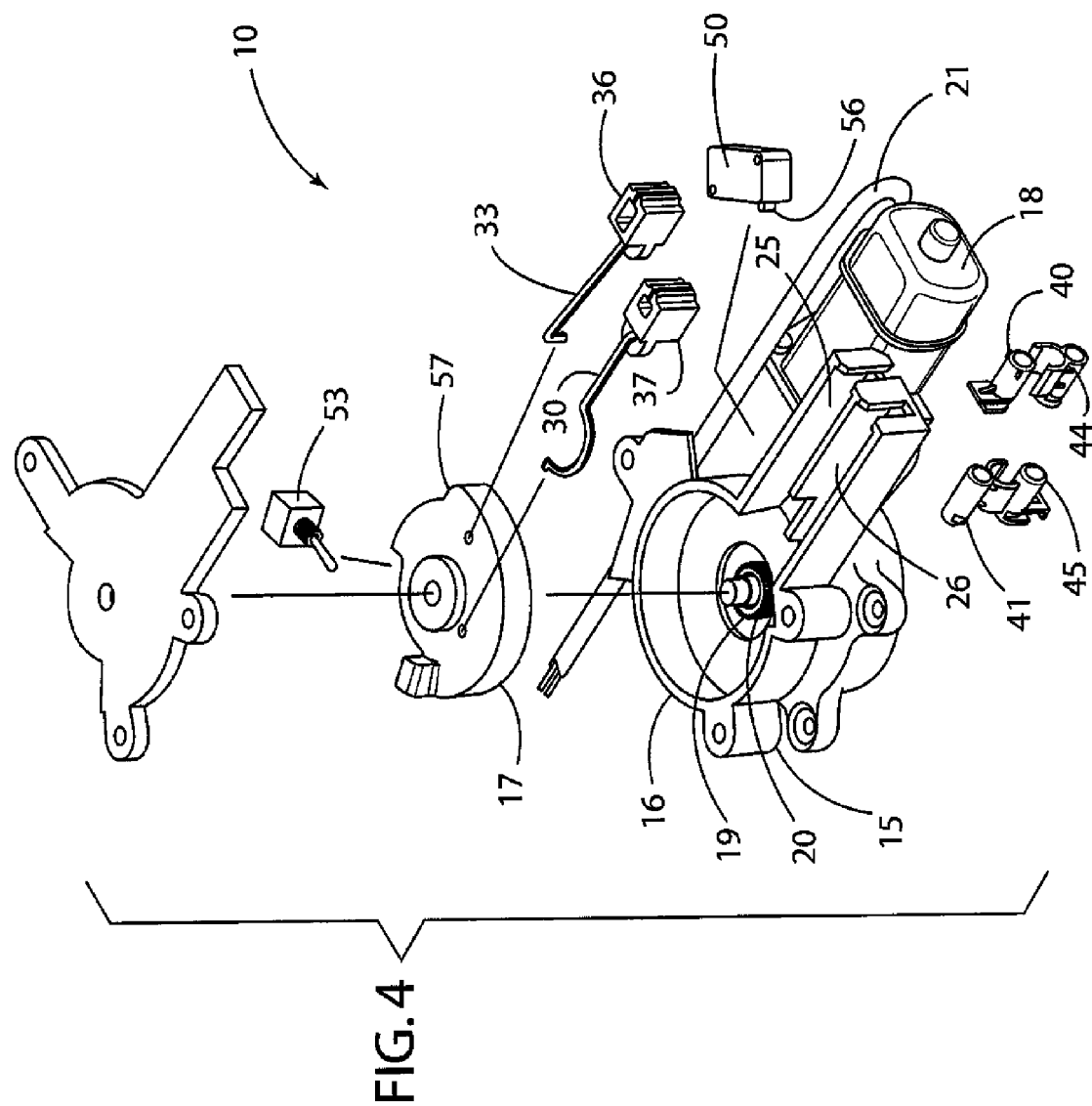
FIG. 4 is an exploded isometric view of the actuator of FIG. 3.

With further reference to FIGS. 3 and 4, powered actuator 10 includes a housing 15 having an enlarged end portion 16 that houses rotating member 17. An electric motor 18 rotates a driven member 19 via a worm-gear drive arrangement (not shown in FIGS. 3 and 4) to thereby rotate the rotating member 17. The driven member 19 may include a plurality of teeth or splines 20 that engage corresponding teeth or splines (not shown) of rotating member 17 to thereby rotationally fix the rotating member 17 relative to the driven member 19. One or more electrical power supply lines 21 supply electrical power to the electrical motor 18.

Housing 15 includes a pair of elongated linear channels 25 and 26 that slidably receive slides 27 and 28, respectively. A rod 30 is pivotably connected to rotating member 17 at a first end 31, and a second end 32 of rod 30 is pivotably connected to slide 28. Similarly, a second rod 33 has a first end 34 that is pivotably connected to rotating member 17, and a second end 35 that is pivotably connected to slide 27. The rods 30 and 33 convert rotary motion of the rotating member 17 into linear motion of slides 27 and 28, respectively. Slides 27 and 28 include fitting portions 36 and 37, respectively, which connect to cables 38 and 39, respectively, which pass through fittings 40 and 41, respectively. Powered actuator 10 may include a pair of rotating members 17 positioned on opposite sides of the driven member 19 in a mirror-image fashion, and may also include an additional pair of rods that are mirror-images of the rods 30 and 33 to thereby drive additional cables 42 and 43 extending from fittings 44 and 45 (FIG. 3) in substantially the same manner as the cables 38 and 39. Thus, a single electric motor 18 can be utilized to drive 4 or more output cables. Also, as discussed in more detail below, the attachment points 31 and 34 for the rods 30 and 33, respectively, can be chosen to control the rate at which the cables 38 and 39 are extended or retracted, and also to control the timing of the extension and retraction of the cables 38 and 39.

Figure 5:
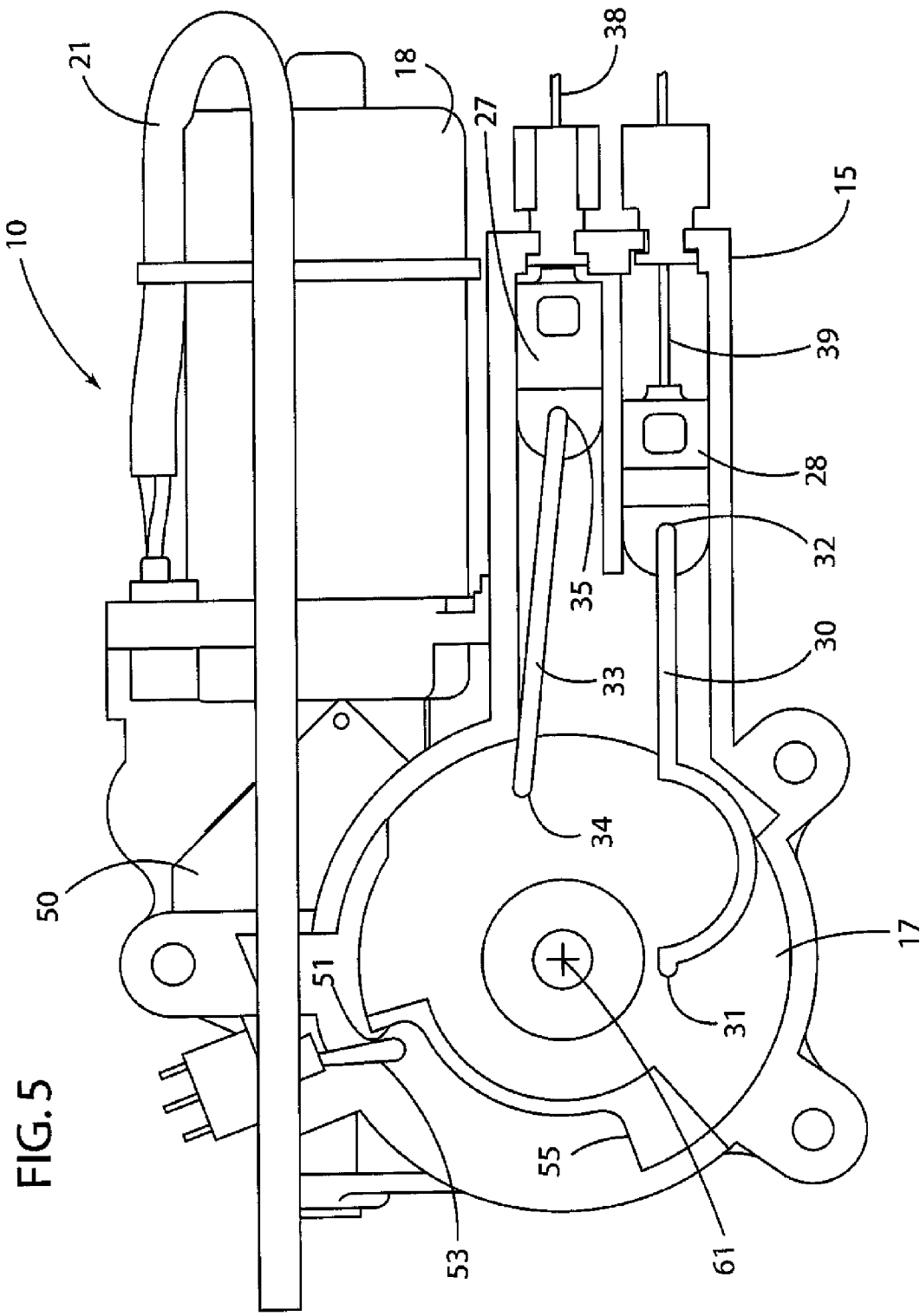
FIG. 5 is a side elevational view of the actuator in a first position.
Figure 6:
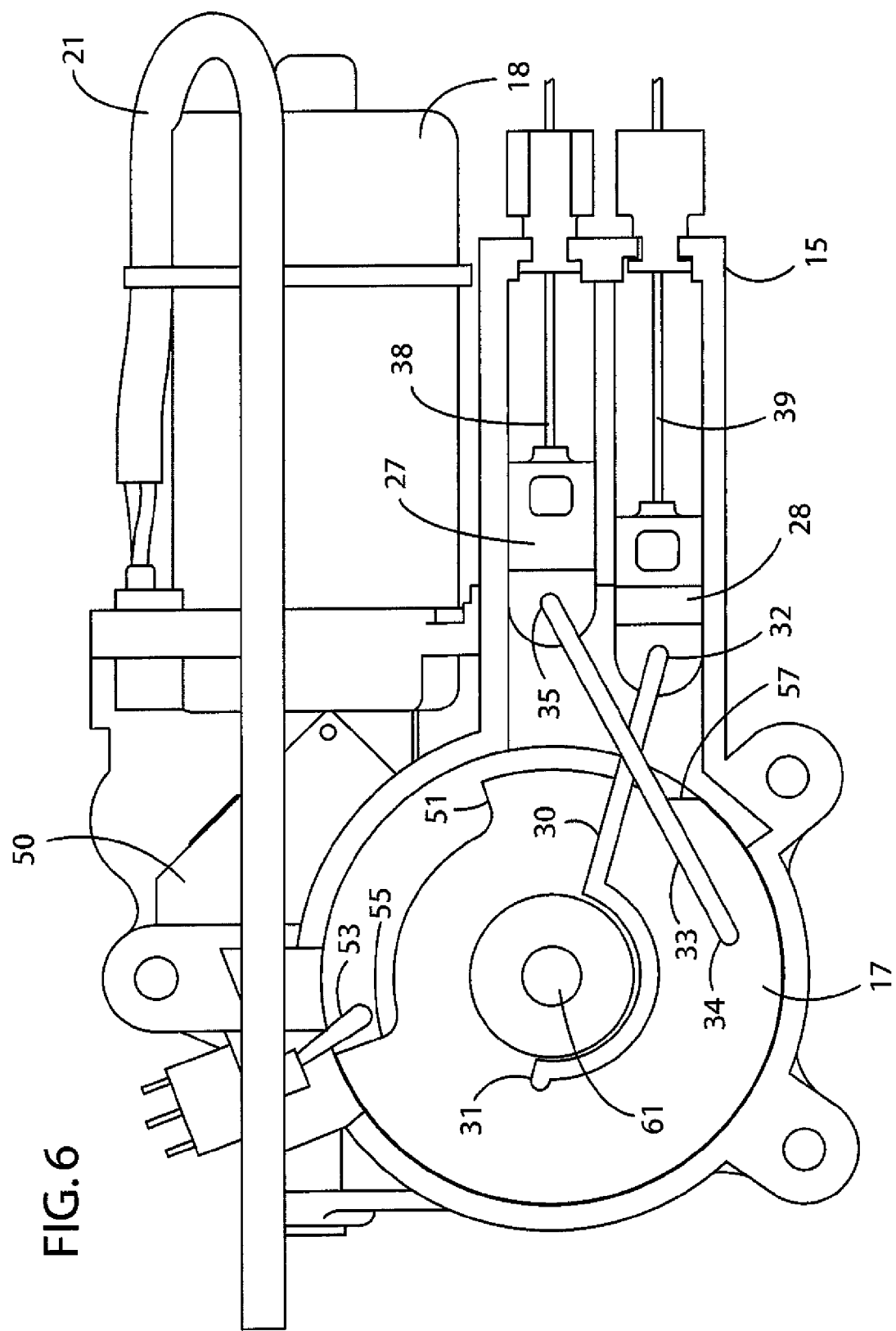
FIG. 6 is a side elevational view of the actuator in a second position.
Figure 7:
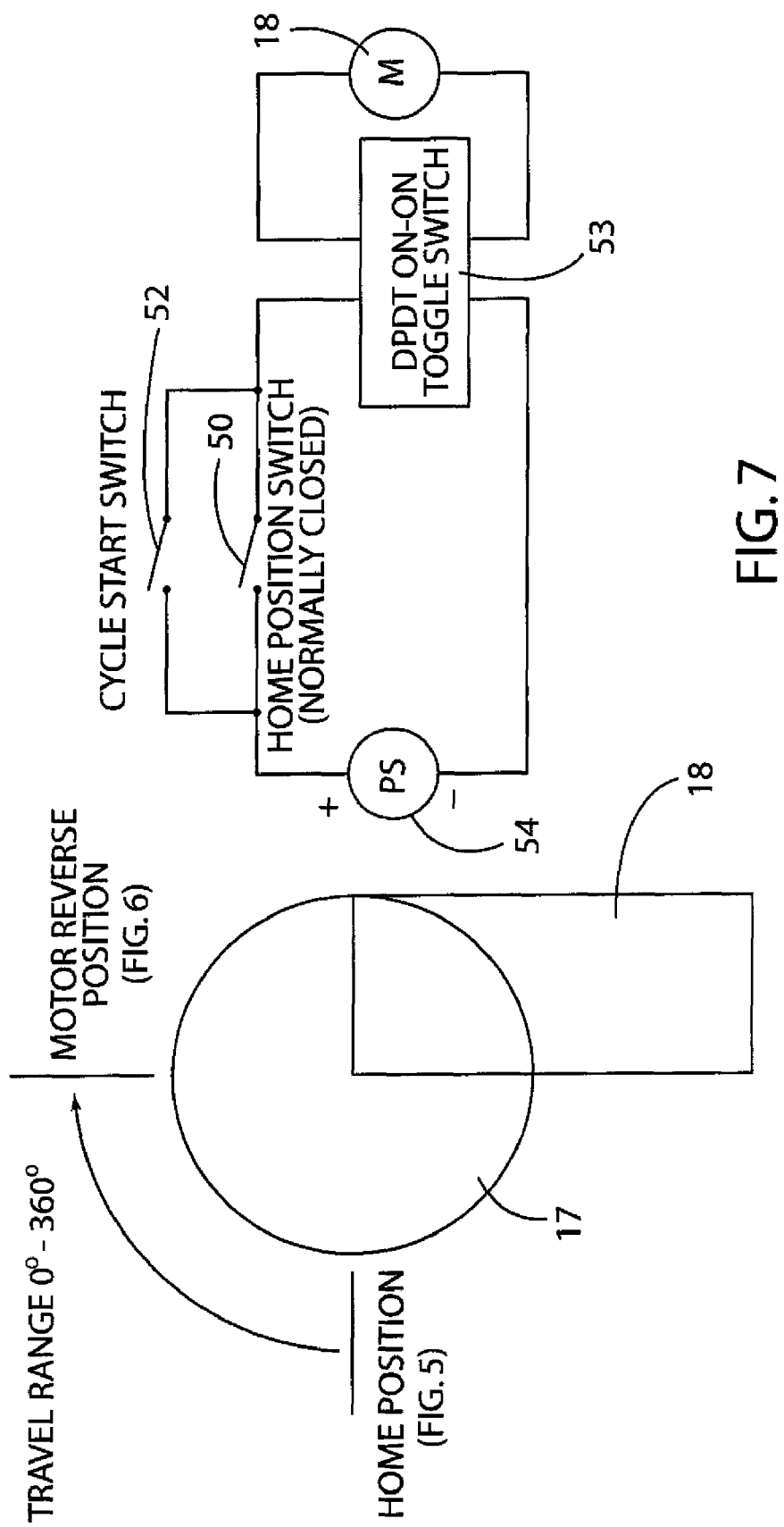
FIG. 7 is a partially schematic view showing a circuit for control of the actuator.

With further reference to FIGS. 5-7, in use electric motor 18 rotates the rotating member 17 from a start or home position illustrated in FIG. 5 to a rotated or motor reverse position of FIG. 6, and then back again to the position illustrated in FIG. 5. A home position switch 50 includes an actuating member 56 (see also FIG. 4) that is configured to engage a surface 57 on rotating member 17. During operation, a toggle switch 53 engages surfaces 51 and 55 of rotating member 17 to selectively reverse the electric motor 18. With reference to FIG. 7, switch 50 is a normally closed switch that is connected in parallel with a cycle start switch 52. Cycle start switch 52 may be a push button switch or the like, and actuation of cycle start switch 52 provides power from power supply 54 to motor 18 through toggle switch 53. When the rotating member 17 is in the "home" position (FIG. 5) and switch 52 is actuated by a user, the electric motor 18 causes the rotating member 17 to rotate from the position of FIG. 5 to the "motor reverse" position of FIG. 6. Once the rotating member 17 reaches the "motor reverse" position shown in FIG. 6, contact surface 55 engages toggle switch 53 to thereby reverse the motor 18, causing the rotating member 17 to move from the "motor reverse" position shown in FIG. 6 back to the home position shown in FIG. 5. Once the rotating member 17 reaches the home position, surface 51 of rotating member 17 causes the toggle switch 53 to move to the position shown in FIG. 5. Because the switch 50 is normally closed, the rotating output member 17 will remain in the home position of FIG. 5 unless the cycle start switch 52 is again actuated.

Instead of switches 50 and 53, an encoder wheel/position sensor or the like (not shown) may be operably connected to the rotating member 17, and the encoder may be connected to a controller (also not shown) that is operably connected to a start switch. The controller may be programmed to monitor the position of the rotating member 17, and provide the functions described above in connection with the circuit illustrated in FIG. 7.

Figure 8:
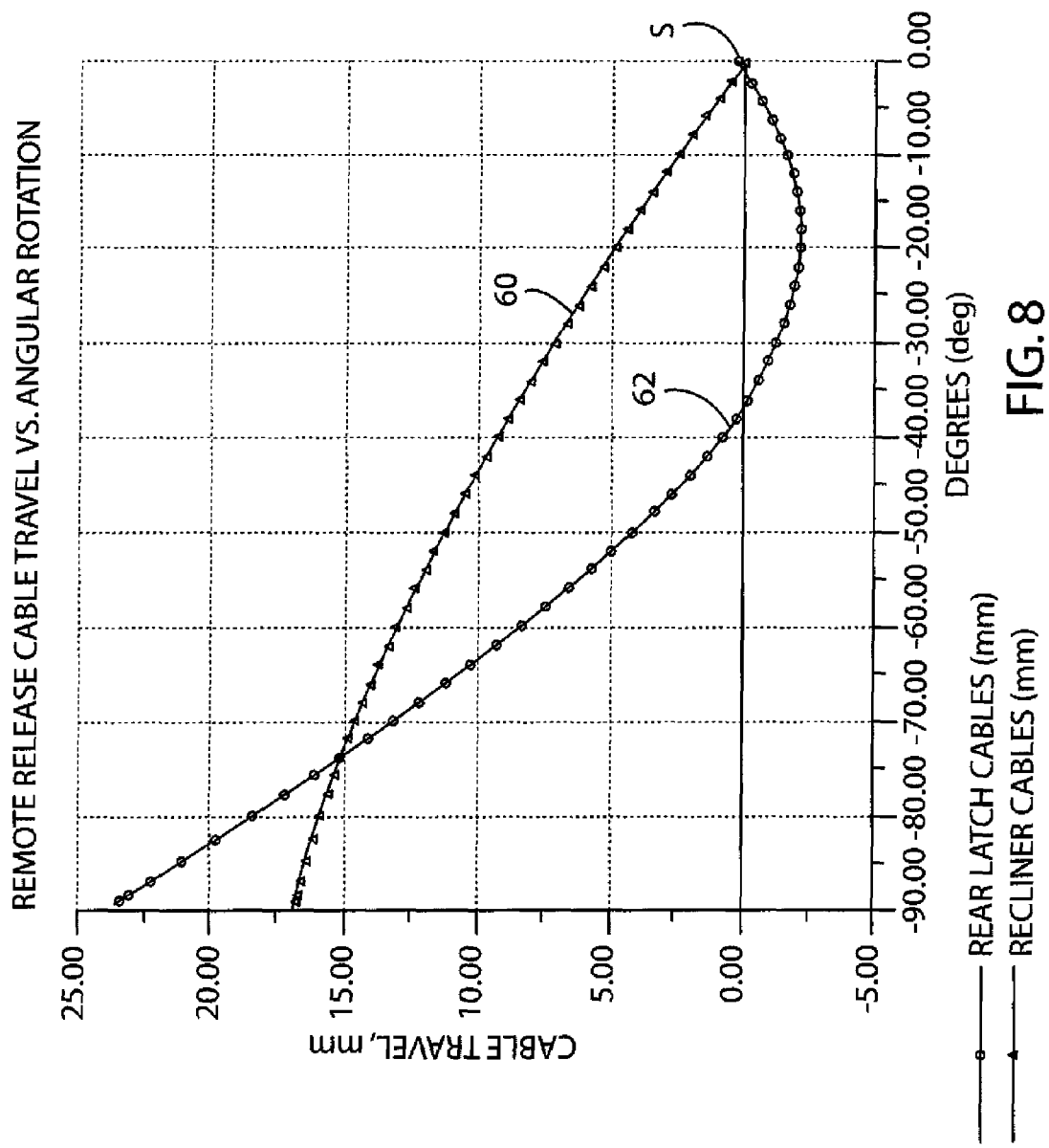
FIG. 8 is a graph showing the cable travel versus angular rotation of the actuator.
Figure 9:
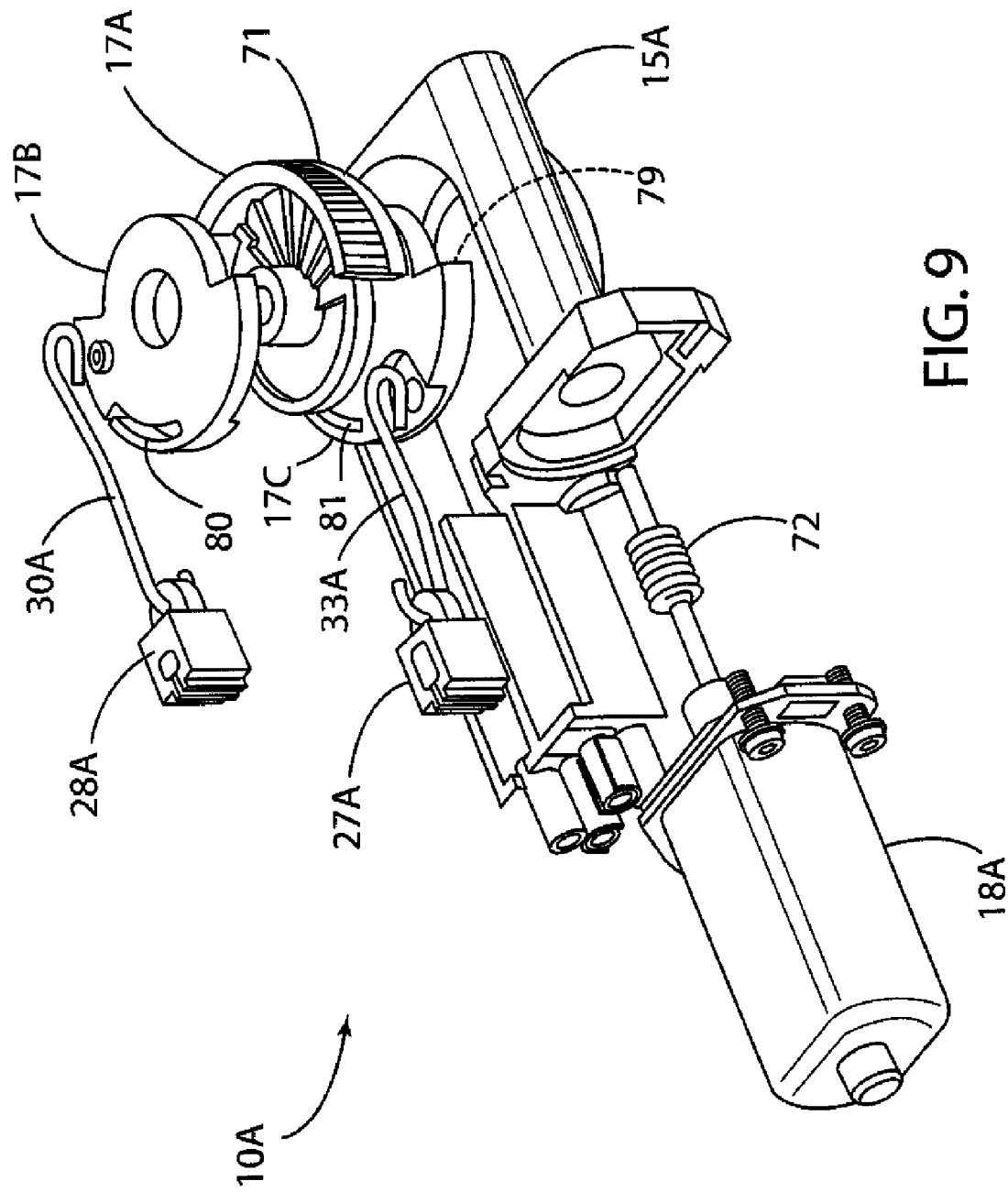
FIG. 9 is an exploded isometric view of a powered actuator according to another aspect of the present invention.

In the illustrated example, the cables 39 and 43 (FIG. 3) are operably connected to the seat back latch mechanism 5 (FIGS. 1 and 2), and the cables 38 and 42 are operably connected to the floor latch 8. With reference to FIG. 5, the position of first end 31 of rod 30 is selected such that cables 39 and 43 are initially moved a relatively large distance as the rotating member 17 begins to move from the position of FIG. 5 to the position of FIG. 6. The movement of the cables 39 and 43 is shown by the line 60 in FIG. 8 as the rotating member 17 moves from the start position "S" corresponding to the "home position" of FIG. 5. The movement of the cables 38 and 42 is shown by the line 62 in FIG. 8. In the illustrated example, the pivot point 31 is positioned a relatively short distance from pivot axis 61 of rotating member 17, such that a relatively large force can be generated on cables 39 and 43, but the cables 39 and 43 move a relatively short distance upon rotation of rotating member 17.

Referring again to FIG. 5, rod 33 is connected to rotating member 17 at first end 34. Thus, as the rotating member 17 begins to rotate from the position of FIG. 5 to the position of FIG. 6, the cables 38 and 42 are not initially moved substantially. However, as the rotating member 17 approaches the position shown in FIG. 6, the cables 38 and 43 begin to move a greater distance. The cables 38 and 42 are connected to the floor latches 8, and the cables 38 and 42 release the floor latches 8 as the rotating member 17 approaches the reverse position of FIG. 6.

The position of the ends 31 and 34 of the rods 30 and 33, respectively, can be chosen to provide for sequential actuation of the latches 5 and 8. In the illustrated example, the powered actuator 10 first releases the back latches 5, causing the seat back 3 to move from the upper position "U" of FIG. 1 to the lowered position "L," followed by release of the floor latches 8. Upon release of the floor latches 8, the seat assembly 1 can be pivoted or "tumbled" upwardly from the position shown in FIG. 1 to the position shown in FIG. 2. It will be understood that the floor latches 8 may be configured such that they will not release unless the back 3 is pivoted to the lower position "L", or sufficiently close to the lower position "L".

If further delay in moving cables 38 and 42 is required, the cables may be configured to have some initial slack when the rotating member 17 is in the position shown in FIG. 5. If slack is present, initial rotation of member 17 will take up the slack prior to pulling on cables 38 and 42. FIGS. 9-12 illustrate a powered actuator 10A according to another aspect of the present invention. Actuator 10A includes a housing 15A and an electric motor 18A. Electric motor 18A drives a worm-gear 72 that engages a gear section 71 of a rotating member 17A to thereby rotate rotating member 17A. As described in more detail below, the electric motor 18A can be actuated to drive rotating member 17A and thereby move the rods 30A and 33A to provide for actuation of output cables to control latches 5 and 8 in substantially the same manner as described in detail above in connection with the powered actuator 10. Powered actuator 10A also includes manual output members 17B and 17C that are operably connected to manual input cables 74 and 75, respectively, to provide for manual activation of the output cables to thereby release the latches 5 and 8.

Figure 11:
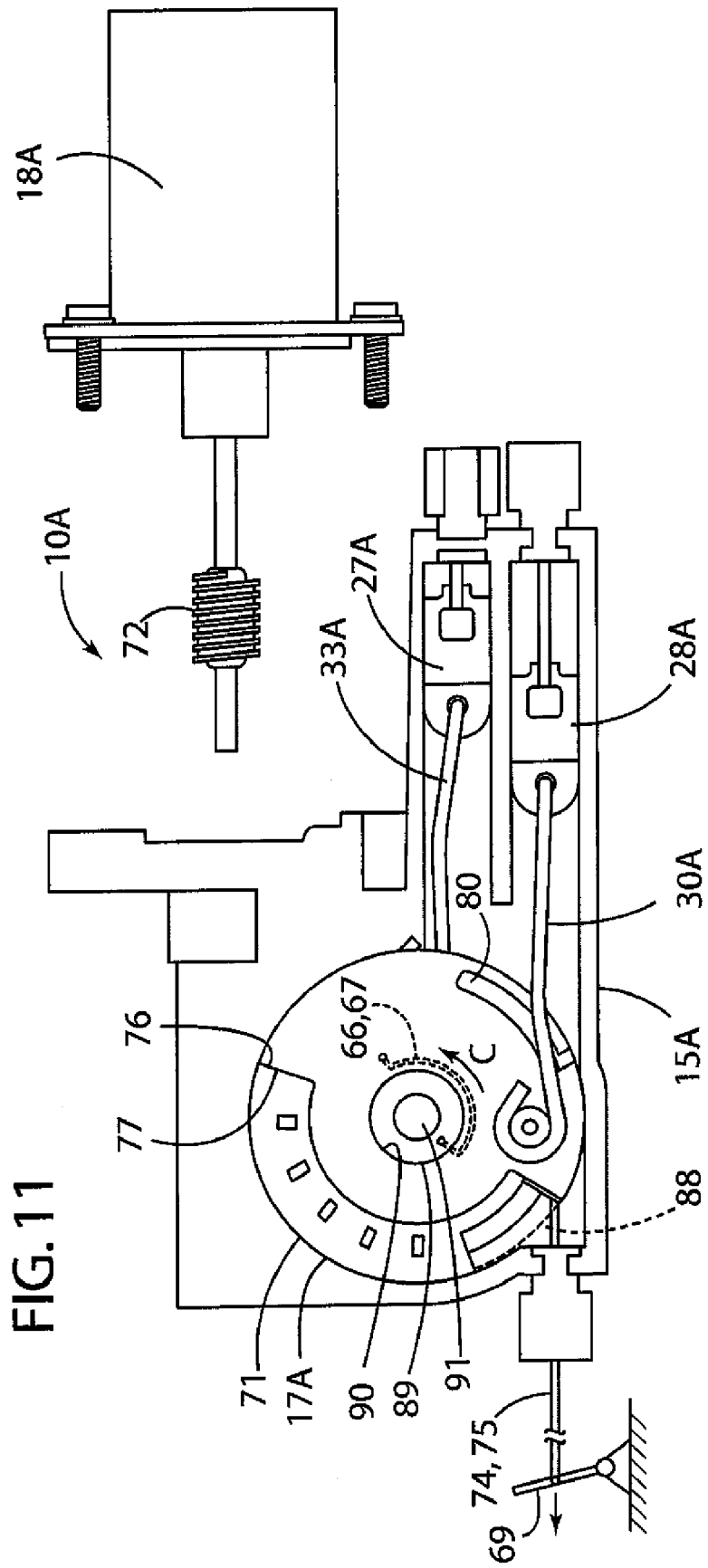
FIG. 11 is a partially fragmentary side-elevational view of the actuator of FIG. 9.
Figure 12:
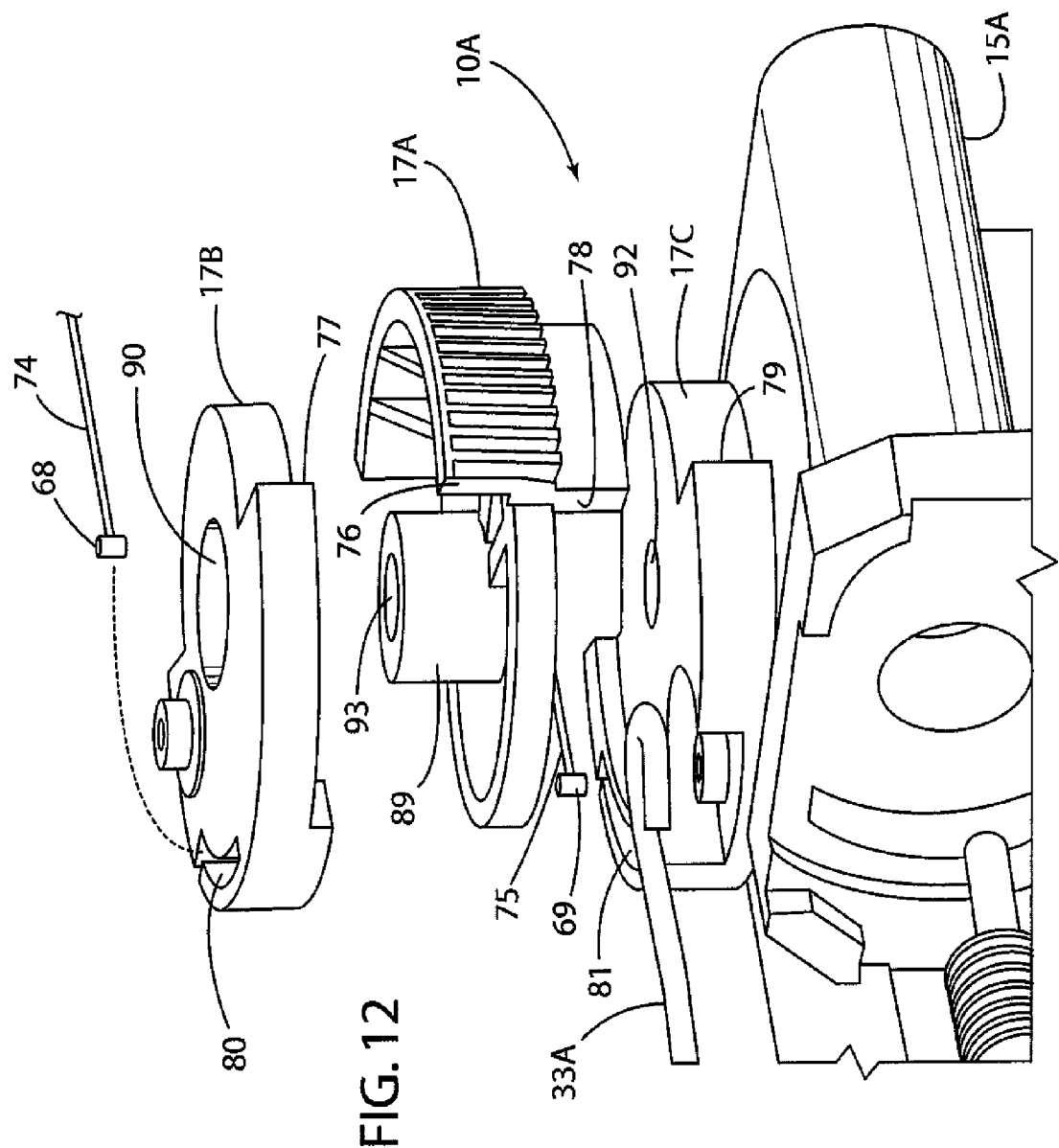
FIG. 12 is a partially fragmentary view of a portion of the actuator of FIG. 9.

With reference to FIG. 12, rotating member 17A includes a first contact surface 76 that engages contact surface 77 of rotating member 17B when the rotating output member 17A is rotated in a clockwise position (FIG. 11) to thereby provide for powered rotation of output member 17B and thereby move the rod 30A and slide 28A. Similarly, a second contact surface 78 (FIG. 12) of rotating member 17A is configured to engage a contact surface 79 of rotating member 17A as the rotating member 17A is rotated in a clockwise direction (FIG. 11) to thereby move rod 33A and slide 27A. In this way, actuation of the motor 18A causes powered rotation of rotating members 17A, 17B, and 17C to thereby move rods 30A and 33A and thereby actuate the latches 5 and 8 in substantially the same manner as described in detail above in connection with the powered actuator 10. Actuator 10A may include switches or an encoder and controller to provide for powered operation in substantially the same manner as described above in connection with actuator 10.

Figure 10:
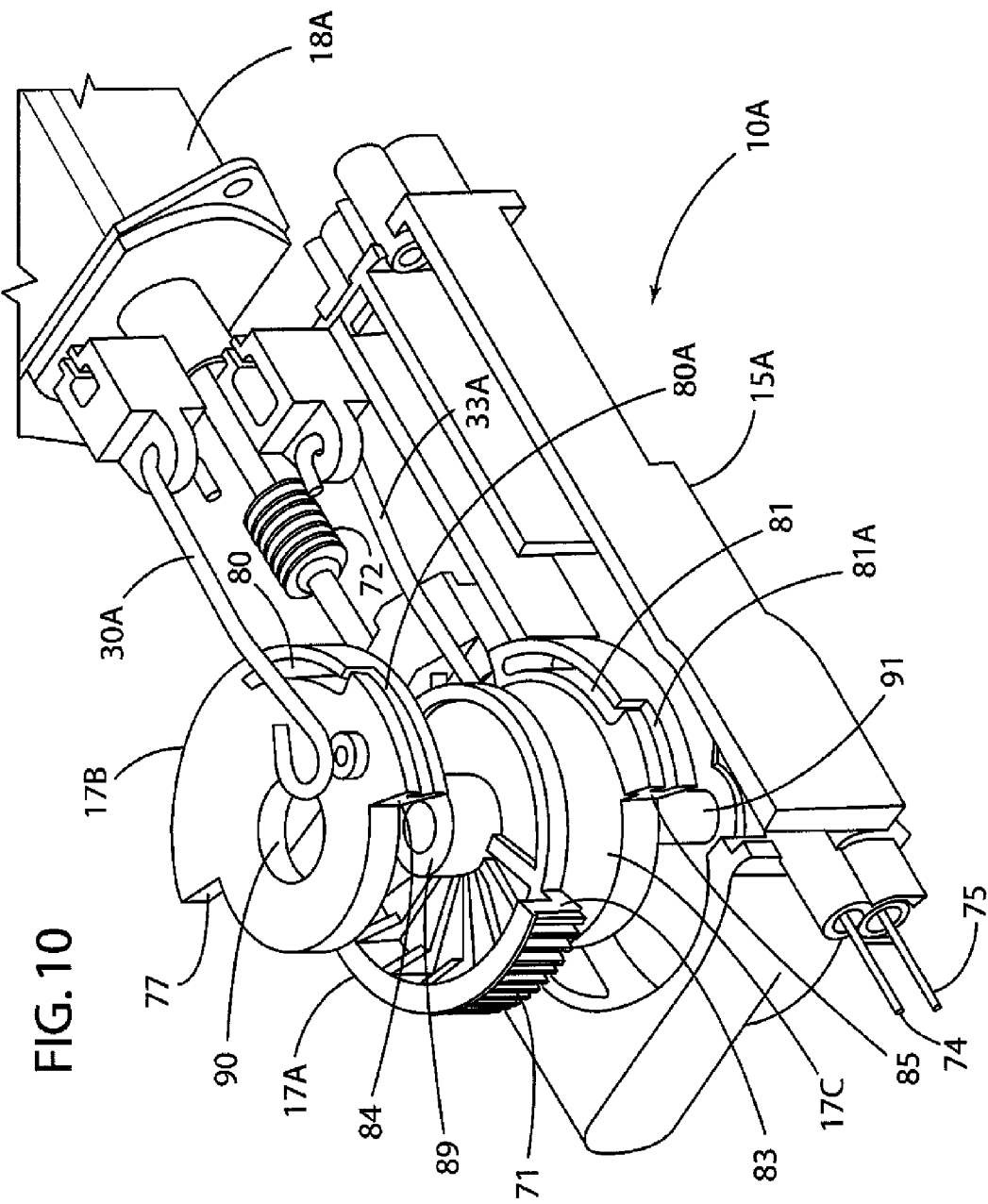
FIG. 10 is a partially fragmentary exploded isometric view of the actuator of FIG. 9.

With reference to FIGS. 10-12, manual release cable 74 includes an end fitting 68 (FIG. 12) that is received in slot connector 80 of rotating member 17B, and manual input cable 75 includes an end fitting 69 (FIG. 12) that is received in slot connector 81 of rotating member 17C. A lever 64 or other manual input device is operably connected to the cables 74 and 75, such that an operator can generate tension in direction "A" (FIG. 11) on the cables 74 and 75. This, in turn, causes the rotating members 17B and 17C to rotate in a counterclockwise direction (FIG. 11), thereby moving the rods 30A and 33A to thereby manually actuate the cables 39, 43 and 38, 42 to actuate the latches 5 and 8, respectively. One or more torsion springs 66, 67 bias the rotating members 17B and 17C in a clockwise manner (Arrow "C"; FIG. 11) relative to rotating member 17A, such that members 17B and 17C rotate counterclockwise back to the home position after a user releases tension previously applied to cables 74 and 75. End 83 (FIG. 10) of gear section 71 of rotating member 17A is configured to provide clearance relative to end surfaces 84 and 85 of rotating member 17B and 17C, respectively, to thereby permit rotation of rotating member 17B and 17C relative to member 17A when the rotating member 71 is at the home position 88 shown in dashed lines in FIG. 11. In the illustrated example, a boss 89 of rotating member 17A is received in opening 90 of rotating member 17B to thereby rotatably interconnect members 17A and 17B, and a boss 91 of housing 15A is received in opening 92 of rotating member 17C and in opening 93 in boss 89 of member 17A to thereby rotatably interconnect member 17A and 17C, and also to rotatably connect members 17A and 17C to the housing 15A.

Figure 13:
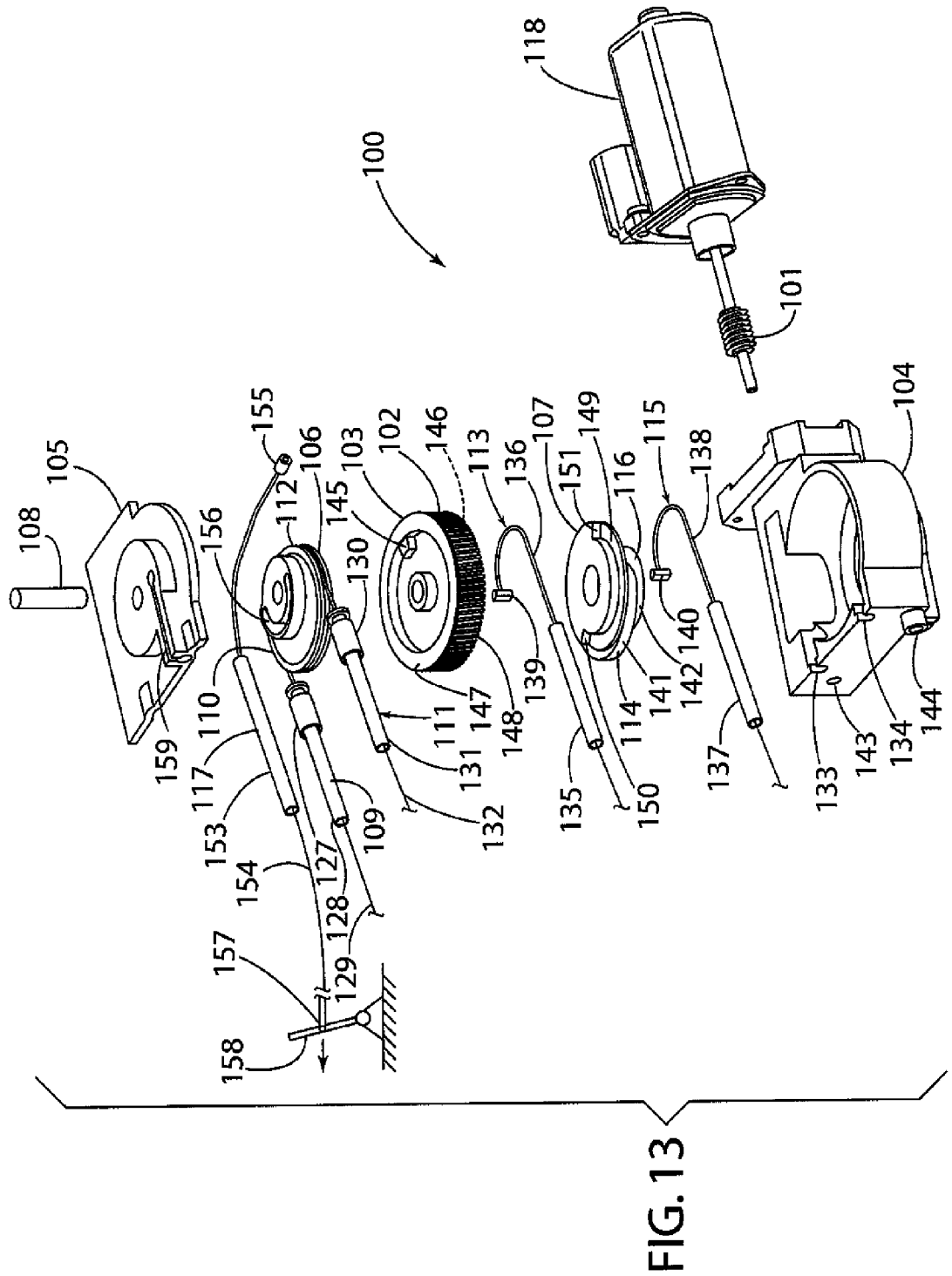
FIG. 13 is an exploded isometric view of a powered actuator according to another aspect of the present invention.
Figure 14:
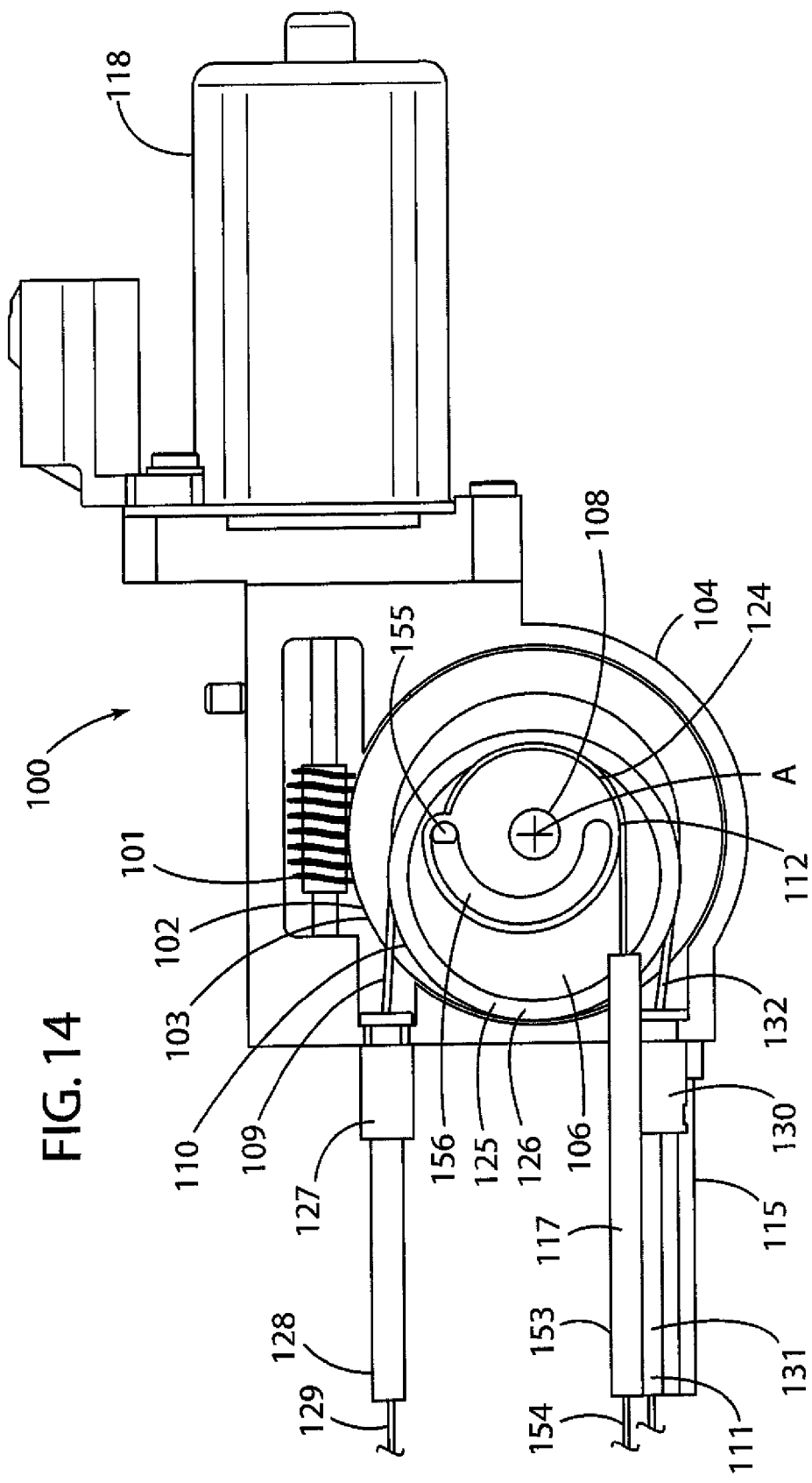
FIG. 14 is a side elevational view of the powered actuator of FIG. 13 in an assembled condition.

With further reference to FIGS. 13 and 14, a powered actuator 100 according to another aspect of the present invention, includes an electric motor 118 that rotates a worm-gear 101. When assembled, the worm-gear 101 engages the teeth 102 of rotating gear member 103. The powered actuator 100 also includes a first housing member 104, and a second housing member 105. When assembled, a first cam member 106 is rotatably interconnected with gear member 103 on a first side thereof, and a second cam member 107 is rotatably interconnected with gear member 103 on the other side thereof. The gear member 103 and the first and second cam members 106 and 107, respectively, are rotatably mounted to the housing members 104 and 105 by a pin 108. The pin 108 may comprise a separate component, or it may comprise a boss that is integrally formed with housing member 104 or housing member 105. As described in more detail below, a first output cable 109 wraps around and engages a first cam surface 110 of first cam member 106, and a second output cable 111 wraps around and engages a second cam surface 112 of first cam member 106. A third output cable 113 wraps around and engages a third cam surface 114 of second cam member 107, and a fourth output cable 115 wraps around and engages a fourth cam surface 116 of rotating cam member 107. Also, a manual release cable 117 may be operably connected to the first cam member 106 to provide for manual rotation of first cam member 106.

First cam surface 110 includes a lobe portion 125 (FIG. 14) that has a radius about axis of rotation "A" that is greater than the radius of other portions of cam surface. Thus, as the cam member 106 rotates in the counterclockwise direction (FIG. 14) from the initial position shown in FIG. 14, the rate at which the output cable 9 moves will increase even if the cam member 106 rotates at a constant angular velocity. Similarly, cam surface 112 includes a lobe portion 126, such that the rate at which output cable 111 moves varies depending upon the angular position of the cam member 106. In the illustrated example, lobe portions 125 and 126 have substantially the same shape and position. However, the output cables 109 and 111 are wrapped around the cam member 106 in opposite directions, such that the movement of the release cables 109, 111 is substantially opposite one another. It will be understood that the shape and position of the cam surfaces 110 and 112, and the lobe portions 125 and 126, may be configured as required for a particular application to provide for the required movement of the release cables 109 and 111. Also, although the movement of the output cables 109 and 111 is greatest when the output cables are engaging the lobes 125 and 126 (if the r.p.m. of electric motor 118 is constant), the amount of force that the release cables 109 and 111 are capable of generating at this point is reduced due to the increased radius of the cam surfaces at the lobes 125 and 126. Thus, if a relatively large amount of force is required during a portion of the range of movement of the release cables 109 and/or 111, the cam surfaces may be configured to provide a relatively small radius, and corresponding increased output force, during this range of movement. In the illustrated example, cable 109 includes a fitting 127 (FIG. 13), and outer sheath 128, and an inner cable 129. Similarly, cable 111 includes a fitting 130, outer sheath 131, and an inner cable 132. The inner cables 129 and 132 of output cables 109 and 111 include suitable end fittings or the like (not shown) to interconnect the inner cables 129 and 132 to the cam member 106. The lobes 125 and 126 may be positioned at the same orientation relative to axis A as shown in FIG. 14. Alternately, the lobes 125 and 126 may be located at different angular positions to provide for different timing with respect to the movement of inner cables 129 and 132. The fittings 127 and 130 engage openings 133 and 134, respectively, in housing member 104. Similarly, cables 113 and 115 extend through openings 143 and 144 in housing member 104. Also, cables 109 and 111 may both be wrapped around first cam member 106 in the same direction, such that cables 109 and 111 move in the same direction upon rotation of cam member 106.

As discussed above, third output cable 113 (FIG. 13) and fourth output cable 115 engage cam surfaces 114 and 116, respectively of second cam member 107. In the illustrated example, the cable 113 includes an outer sheath 135 and an inner cable 136, and cable 115 includes an outer sheath 137 and an inner cable 138. Fittings 139 and 140 of inner cable members 136 and 138, respectively, are interconnected with corresponding notches or other retaining features (not shown) of second cam member 107 to thereby interconnect the inner cable members 136 and 138 to the cam member 107. In the illustrated example, the cables 113 and 115 wrap around cam member 107 in the same direction, such that released cables 113 and 115 extend and retract in the same direction as cam member 107 rotates. Alternately, cables 113 and 115 may wrap around cam member 107 in opposite directions such that cables 113 and 115 move in substantially opposite directions upon rotation of cam member 107. The cam surfaces 114 and 116 may include lobe portions 141 and 142. The size, shape, and position of the lobe portions 141 and 142 may be configured to provide the desired amount of movement of the release cables 113 and 115, and to provide the desired timing for the movement of the cables 113 and 115. Also, the size and shape of the lobe portions 141 and 142 may be configured to provide the necessary output force during specific portions of the movement of the release cables 113 and 115.

The rotating cam members 106 and 107 may be interconnected with the gear member 103 utilizing a lost motion-type connection. Gear member 103 may include an engagement or protrusion 145 on a first side 107 of gear member 103. Gear member 103 may include a substantially identical engagement member 146 on an opposite side 148 of the gear member 103. Cam member 107 includes an annular clearance or cutout 149 forming engagement surfaces 150 and 151. The engagement member or protrusion 146 of gear member 103 is positioned in the clearance 149 when the actuator 100 is assembled. Upon actuation of electric motor 118, gear member 103 rotates. The position of the engagement member or protrusion 146 and the engagement surfaces 150 and 151 can be selected such that the gear member 103 initially rotates through a predetermined angular range of motion without moving cam member 107. However, the engagement member 146 will eventually contact/engage one of the engagement surfaces 150 or 151 of cam member 107, such that the cam member 107 will then rotate with the gear member 103. If the gear member 103 is then rotated in an opposite direction, the gear member 103 will initially rotate without rotating cam member 107 until the other of the engagement surfaces 150, 151 engages the engagement member 146 of gear member 103. It will be apparent, however, that if a tension force is applied to one or both of the cables 113 and 115, this force may cause cam member 107 to rotate immediately upon rotation of gear member 103. Cam member 106 also includes a clearance portion and engagement surfaces (not shown) on a lower side (FIG. 13) that may be substantially identical to the clearance portion 109 and engagement surfaces 150 and 151 of cam member 107 that engage protrusion 145 of gear member 103 to thereby provide a lost motion-type interconnection between cam member 106 and gear member 103. It will be understood that the cam members 106 and 107 may be fixed to the gear member 103, or formed integrally therewith if a lost motion-type interconnection is not required for a particular application.

As discussed above, a manual release cable 117 may be connected to cam member 106 to provide for manual release. The manual release cable 117 includes an outer sheath 153 and an inner cable 154. A fitting 155 of inner cable 154 is received in an arcuate slot 156 (FIG. 14) in cam member 106, and an opposite end 157 of inner cable 157 is interconnected to a manual release lever or member 158. Inner cable member 154 of manual release cable 117 wraps around an arcuate surface portion 124 of first cam member 106. When assembled, the cable 117 extends through slot 159 in the housing member 105. The arcuate slot 156 of cam member 106 provides a lost motion-type interconnection between the manual release cable 117 and the cam member 106. The lost motion connection permits cam member 106 to rotate upon actuation of electric motor 118 without causing manual release cable 117 to move and thereby bind or kink. The manual release cable 117 can be utilized to rotate cam member 106 to selectively actuate the release cables 109 and 111 without actuation of electric motor 118. Thus, for example, if the release cables 109 and 111 are connected to a pair of back latch mechanisms 5 (FIG. 1), the release lever or member 158 can be actuated by a user to provide for angular adjustment of the seat back 3 without actuation of electric motor 118 and without release of the floor latches 8.

Powered actuator 100 and electric motor 118 may be configured to provide for powered release of back latches 5, without release of floor latches 8. For example, an encoder or other position measuring device (not shown) may be operably connected to the electric motor 118 or gear member 103, and the powered actuator 100 may be configured to operate in a first mode wherein the electric motor 118 rotates only enough to shift cables 113 and 115 to thereby release the back latch 5, without releasing floor latch 8. The electric motor 18 may also be configured to operate in a second mode wherein the electric motor 18 actuates all four cables (i.e. cables 109, 111, 113, and 115) to thereby release the back latch mechanisms 5 and the floor latches 8.

Figure 15:
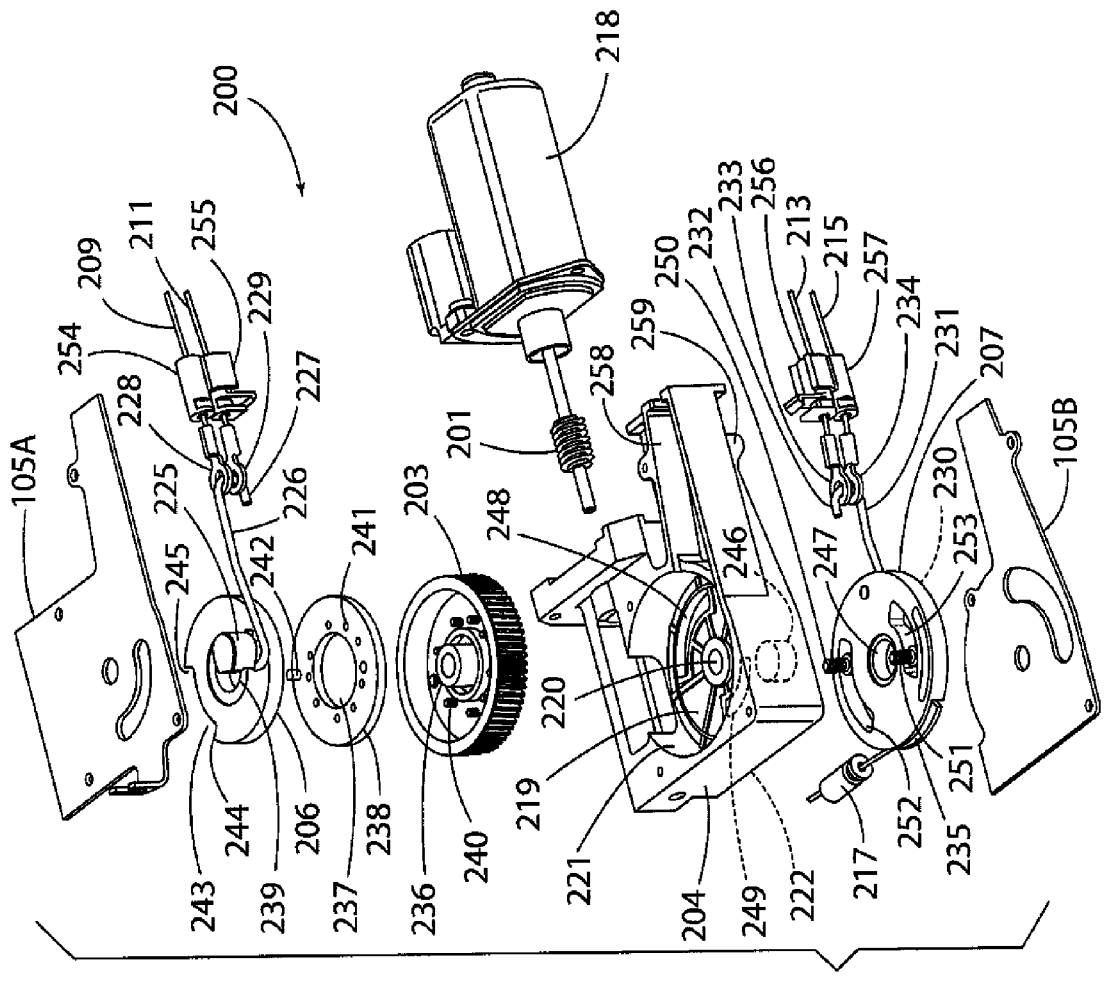
FIG. 15 is an exploded isometric view of a powered actuator according to another aspect o of the present invention.
Figure 16:
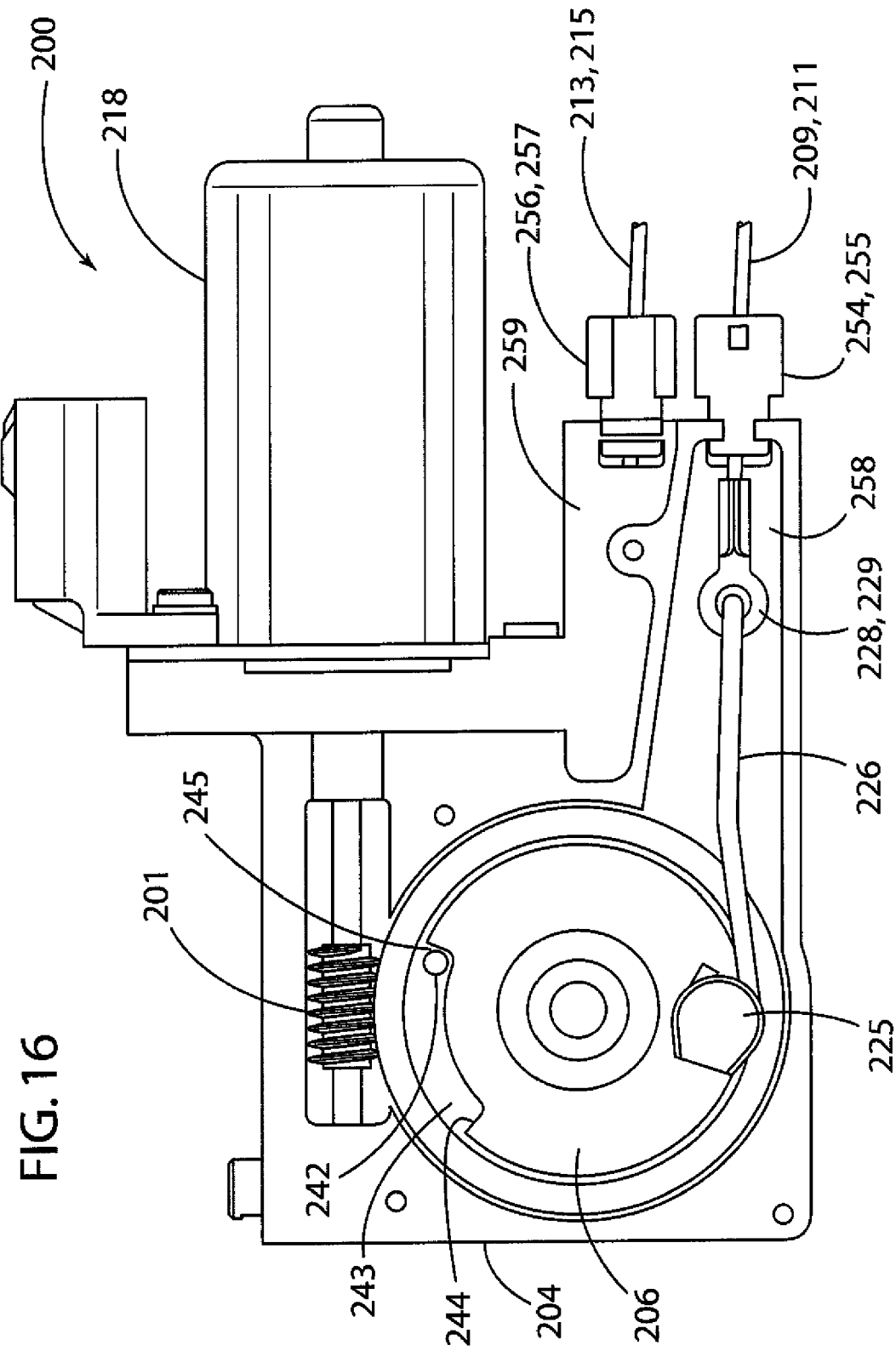
FIG. 16 is a side elevational view of the actuator of FIG. 15 in an assembled condition.

With further reference to FIGS. 15 and 16, a powered actuator 200 according to another aspect of the present invention includes an electric motor 218 that drives a worm-gear 201. The worm-gear 201, in turn, rotatably engages a gear member 203. As described in more detail below, gear member 203 is operably connected to first and second rotating members 206 and 207. A housing member 204 includes a first cavity 221 that receives gear member 203 and rotating member 206, and a second cavity 222 that receives second rotating member 207. A wall or web 219 divides the second cavity 222 that receives second rotating member 207. A wall or web 219 divides the first cavity 221 and second cavity 222, and an opening 220 in wall 219 provides for rotating interconnection of gear member 203 with the housing 204.

When assembled, cover members 105A and 105B connect to the housing member 204 to close off the first cavity 221 and second cavity 222, respectively.

Rotating member 206 includes a boss or protrusion connector 225 that connects to a rod or link 226. The link 226 includes a hooked end 227 that is interconnected with connectors or fittings 228 and 229 of output cables 209 and 211, respectively. Rotation of first rotating member 206 causes the link 226 to move, thereby moving the release cables 209 and 211. The position of boss connector 225 on rotating member 206 can be selected to provide the specific motion required for the release cables 209 and 211. Similarly, rotating member 207 includes a boss or other connector 230 that may be substantially similar to boss 225, and a rod or link 231 is connected to the connector 230. Hooked end 232 of rod 231 is connected to the connectors 233 and 234 of release cables 213 and 215, respectively, such that rotation of second member 207 causes rod 231 to move the release cables 213 and 215. The position of boss or connector 230 on rotating member 207 can be selected to provide proper motion of the release cables 213 and 215. A manual release cable 217 is received in a slot 235 of rotating member 207 to provide for manual release.

Gear member 203 includes a boss 236 that extends through an opening 237 in a ring member 238, and into opening 239 of rotating member 206. Gear member 203 includes a plurality of protrusions or fasteners 240 that are received in openings 241 of ring member 238 to thereby interconnect the ring member 238 and gear member 203. Gear member 238 includes pin or protrusion 242 that is received in an arcuate slot or clearance portion 243 of rotating member 206 to thereby provide a lost motion-type interconnection between gear member 203 and rotating member 206. Alternately, rotating member 206 may be fixed to gear member 203, or it may be formed integrally therewith. The lost motion interconnection between gear member 203 and rotating member 206 provides for rotation of gear member 203 through a range of motion without causing rotation of rotating member 206. For example, the pin 242 and arcuate slot 243 may be configured such that when electric motor 215 is initially actuated, the gear member 203 rotates through a pre-selected range of motion before pin 242 engages one of the end surfaces 244 or 245 of arcuate slot 243. Once the pin 242 engages one of the end surfaces 244-245, further rotation of gear member 203 will cause rotating member 206 to rotate. In this way, the timing of the rotation of rotating member 206 and release cables 209 and 211 can be configured as required for a particular application.

Housing member 204 may include a boss 246 that protrudes into second cavity 222, and into opening 247 of rotating member 207 to thereby rotatably support the rotating member 207 in second cavity 222. Housing 204 includes a pair of arcuate slots 248 and 249 through the sidewall 219. Rotating member 207 includes a pair of arcuate slots 252 and 253, and threaded fasteners 250 and 251 are received in the arcuate slots 252 and 253, respectively. When assembled, the threaded fasteners 250 and 251 extend through arcuate slots 248 and 249 in wall 219 of housing 204, and threadably engage gear member 203 to thereby interconnect gear member 203 and rotating member 207. The arcuate slots 252 and 253 and rotating member 207 provide a lost motion-type interconnection between rotating member 207 and gear member 203. The slots 252 and 253 can be configured such that manual release cable 217 can be utilized to rotate member 207 without rotation of gear member 203, to thereby provide for manual actuation/movement of release cables 213 and 215.

With reference to FIG. 16, fittings 254 and 255 of cables 209 and 211 are mounted to a first portion 258 of housing 204, and fittings 256 and 257 of cables 213 and 215, respectively are connected to a second portion 259 of housing 204. Thus, the actuator 200 (FIG. 16) provides for an opposite orientation of the actuator cables relative to the actuator 100 (FIG. 14). It will be understood that the housing 204 may have a variety of configurations as required for a particular application.

The powered actuator of the present application provides for multiple cable outputs to control a plurality of locks/latches or other mechanisms. The movements of the cables can be controlled as required for a particular application to provide the desired amount of cable travel, and to provide for sequential movement of the output cables as required for a particular application.

In the foregoing description, it will be readily appreciated by those skilled in the art that modifications may be made to the invention without departing from the concepts disclosed herein.

The invention claimed is:

1. A seat assembly for motor vehicles, comprising:
a seat base configured to be movably mounted to a floor structure of a vehicle for movement between a use position and a stowed position;
a first mechanism configured to selectively retain the seat base in the use position;
a seat back pivotably connected to the seat base;
a second mechanism selectively retaining the seat back in a selected position relative to the seat base;
a switch;
a powered actuator device operably connected to the switch and the first and second mechanisms, the powered actuator device including an electric motor having a movable output member that is mechanically connected to the first and second mechanisms by first and second elongated members that transmit force from the movable output member to the first and second mechanisms such that the electric motor releases the first and second mechanisms in a predefined sequence upon actuation of the switch.

2. The seat assembly of claim 1, wherein:
the movable output member comprises a rotatable output member operably connected to the electric motor for movement through a range of motion during operation, and wherein the first and second elongated members comprise first and second cables having first ends that are connected to the first and second mechanisms, respectively, and second ends that are connected to the rotating output member, and wherein the first and second cables move at different rates during at least a portion of the range of motion of the rotatable output member.

3. The seat assembly of claim 2, wherein:
the rotating output member rotates about an axis of rotation; and
the rotating output member comprises first and second cam surfaces that define first and second lobes, respectively, and wherein the first and second lobes define a non-zero angle therebetween about the axis of rotation of the rotating output member, and wherein the first and second cables wrap around the first and second cam surfaces.

4. The seat assembly of claim 1, wherein:
the first and second elongated members comprise first and second links connected to first and second cables, respectively, and pivotably connected to the rotating output member.

5. The seat assembly of claim 1, including:
a manual release operably connected to the powered actuator device and a manual release member whereby movement of the manual release member releases at least one of the first and second mechanism without actuation of the electric motor.

6. A seat assembly for motor vehicles, comprising:
a seat base configured to be movably mounted to a floor structure of a vehicle for movement between a use position and a stowed position;
a first mechanism configured to selectively retain the seat base in the use position;

a seat back pivotably connected to the seat base;
a second mechanism selectively retaining the seat back in a selected position relative to the seat base;
a switch;
a powered actuator device operably connected to the switch and the first and second mechanisms, the powered actuator device including an electric motor that releases the first and second mechanisms in a predefined sequence upon actuation of the switch the powered actuator device further including a rotatable output member operably connected to the electric motor for movement through a range of motion during operation, and first and second cables operably connected to the first and second mechanisms, respectively, and to the rotating output member, and wherein the first and second cables move at different rates during at least a portion of the range of motion of the rotatable output member; and wherein:
the rotating output member includes first and second non-cylindrical cam surfaces, and the first and second cables are wrapped around at least a portion of the first and second cam surfaces, respectively.

7. A seat assembly for motor vehicles, comprising:
a seat base configured to be movably mounted to a floor structure of a vehicle for movement between a use position and a stowed position;
a first mechanism configured to selectively retain the seat base in the use position;
a seat back pivotably connected to the seat base;
a second mechanism selectively retaining the seat back in a selected position relative to the seat base;
a switch;
a powered actuator device operably connected to the switch and the first and second mechanisms, the powered actuator device including an electric motor that releases the first and second mechanisms in a predefined sequence upon actuation of the switch, the powered actuator device further including a rotatable output member that rotates about an axis of rotation, wherein the rotatable output member is operably connected to the electric motor for movement through a range of motion during operation, the rotatable output member including first and second cam surfaces define first and second lobes, respectively, and wherein the first and second lobes define a non-zero angle therebetween about the axis of rotation of the rotating output member, the powered actuator device including first and second cables operably connected to the first and second mechanisms, respectively, and to the rotating output member, and wherein the first and second cables move at different rates during at least a portion of the range of motion of the rotatable output member; and wherein:
the powered actuator device includes a housing and first and second slide members slidably engaging the housing, and wherein the first slide member is connected to the first link and the first cable, and the second slide member is connected to the second link and the second cable.

8. An actuator device, comprising:
an electric motor including a rotating output member having first and second non-cylindrical cam surfaces;
first and second cables operably connected to the electric motor and engaging the first and second cam surfaces, respectively, such that the first and second cables move at first and second rates of movement upon actuation of the electric motor, and wherein the first and second rates of movement are not always equal;
a housing defining first and second guide portions; and
first and second slide members movably engaging the first and second guide portions, wherein the first slide member is connected to the first link and the first cable, and the second slide member is connected to the second link and the second cable.

9. The actuator device of claim 8, wherein:
the first and second slide members move linearly upon actuation of the electric motor.

10. An actuator device, comprising:
a powered actuator comprising an electric motor having a rotating drive member that rotates in a first direction and a second direction that is opposite the first direction;
a rotatable output member defining an angular position and an angular velocity, wherein the rotatable output member is operably coupled to the powered actuator to provide rotation of the rotatable output member upon actuation of the powered actuator;
an elongated flexible output member operably connected to the rotatable output member such that the elongated flexible output member shifts longitudinally upon rotation of the rotatable output member and defines a rate of movement, and wherein the rate of movement of the elongated flexible output member varies with both the angular position and the angular velocity of the rotatable output member according to a predefined relationship;
a switch and wherein actuation of the switch causes the powered actuator to rotate the rotatable output member in a first angular direction from a start position to a rotated position, followed by rotation of the rotatable output member in a second angular direction from the rotated position back to the start position;
a toggle switch configured to reverse the direction of rotation of the rotating drive member from the first direction to the second direction when the rotatable output member reaches the rotated position; and wherein:
the rotatable output member includes an annular cut out portion forming an engagement surface, and wherein the toggle switch includes a movable member that engages the engagement surface when the rotatable output member reaches the rotated position to actuate the toggle switch.

11. An actuator device, comprising:
a powered actuator;
a rotatable output member defining an axis of rotation, an angular position, and an angular velocity, wherein the rotatable output member is operably coupled to the powered actuator to provide rotation of the rotatable output member upon actuation of the powered actuator;
an elongated flexible output member operably connected to the rotatable output member such that the elongated flexible output member shifts longitudinally upon rotation of the rotatable output member and defines a rate of movement, and wherein the rate of movement of the elongated flexible output member varies with both the angular position and the angular velocity of the rotatable output member according to a predefined relationship;
a link member pivotably connected to the rotatable output member at a point that is spaced-apart from the axis of rotation, and wherein the link member is also connected to the elongated flexible output member;
a housing structure defining a guide portion; and
a slide member connected to the link member and the elongated flexible output member, wherein the slide member movably engages the guide portion of the housing structure.

12. The actuator device of claim 11, wherein:

the slide member moves linearly along the guide portion of the housing in a reciprocating manner upon rotation of the rotatable output member.

13. The actuator device of claim 12, wherein:

the guide portion of the housing comprises a channel having opposite sidewall surfaces facing one another, and wherein the slide member defines opposite side surfaces that slidably engage the opposite sidewall surfaces of the channel.

14. An actuator device, comprising:

a powered actuator;

a rotatable output member defining an angular position and an angular velocity, wherein the rotatable output member is operably coupled to the powered actuator such that the powered actuator rotates the rotatable output member in a first direction and in a second direction that is opposite the first direction upon actuation of the powered actuator, and wherein the rotatable output member rotates through a predefined range of movement during operation of the actuator device;

at least four elongated flexible output members operably connected to the rotatable output member, and wherein a first pair of elongated flexible output members move at a first velocity upon rotation of the rotatable output member, and a second pair of elongated flexible output members move at a second velocity upon rotation of the rotatable output member, wherein the second velocity is substantially different than the first velocity during at least a portion of the predefined range of movement of the rotatable output member; and wherein:

at least one of the elongated flexible output members is operably connected to the rotatable output member such that the one elongated flexible output member shifts longitudinally upon rotation of the rotatable output member and defines a rate of movement, and wherein the rate of movement of the one elongated flexible output member varies with both the angular position and the angular velocity of the rotatable output member according to a predefined relationship.

15. The actuator device of claim 14, wherein:

the rotatable output member comprises a center drive member and first and second rotating members disposed on opposite sides of the center drive member, wherein the first and second rotating members are operably connected to the center drive member, and wherein the first pair of elongated flexible output members are operably connected to the first rotating member, and the second pair of elongated flexible output members are operably connected to the second rotating member.

16. The actuator device of claim 15, wherein:

the first and second rotating members are operably connected to the center drive member by a lost motion interconnection that permits at least some movement of the center drive member without movement of the one rotating member.

17. The actuator device of claim 16, wherein:

the powered actuator comprises an electric motor driving a gear having teeth; and the center drive member includes teeth engaging the teeth of the gear.

18. The actuator device of claim 17, including:

a vehicle floor structure;

a seat assembly having a base rotatably mounted to the vehicle floor structure and retained in a use position relative to the vehicle floor structure by a first pair of mechanisms, the seat assembly further including a back that is retained in a selected angular position relative to the base by a second pair of mechanisms, and wherein:

the first pair of elongated flexible output members are connected to the first pair of mechanisms, and the second pair of elongated flexible output members are connected to the second pair of mechanisms, and wherein actuation of the powered actuator releases the first and second pairs of mechanisms.

19. The actuator device of claim 18, wherein:

the first and second pairs of mechanism are released at different times upon actuation of the powered actuator.

20. The actuator device of claim 19, wherein:

the second pair of mechanisms are released before the first pair of mechanisms upon actuation of the powered actuator.

* * * * *